Dec. 16, 1930.                I. SIMONIS                1,785,534
                              LEER FEEDER
                        Filed April 12, 1928    2 Sheets-Sheet 1
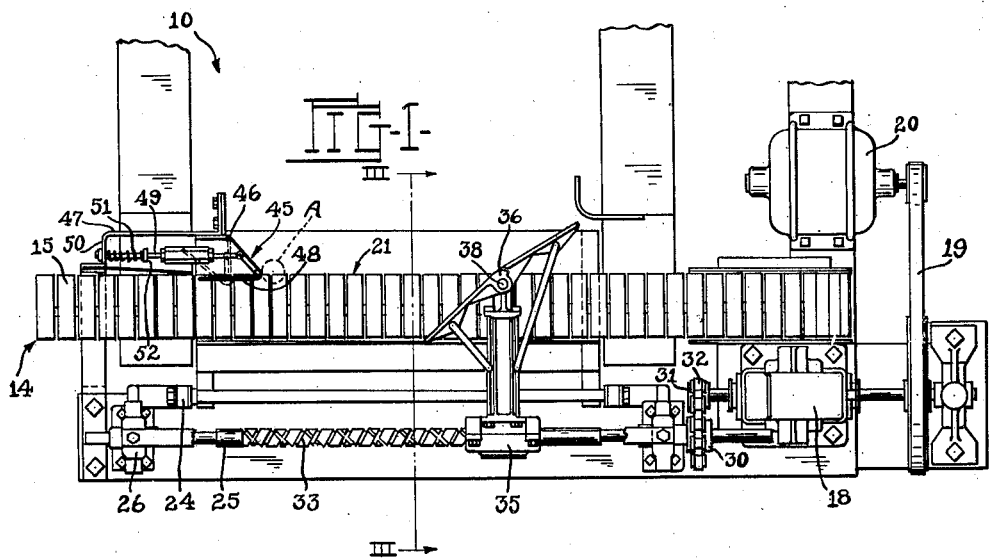
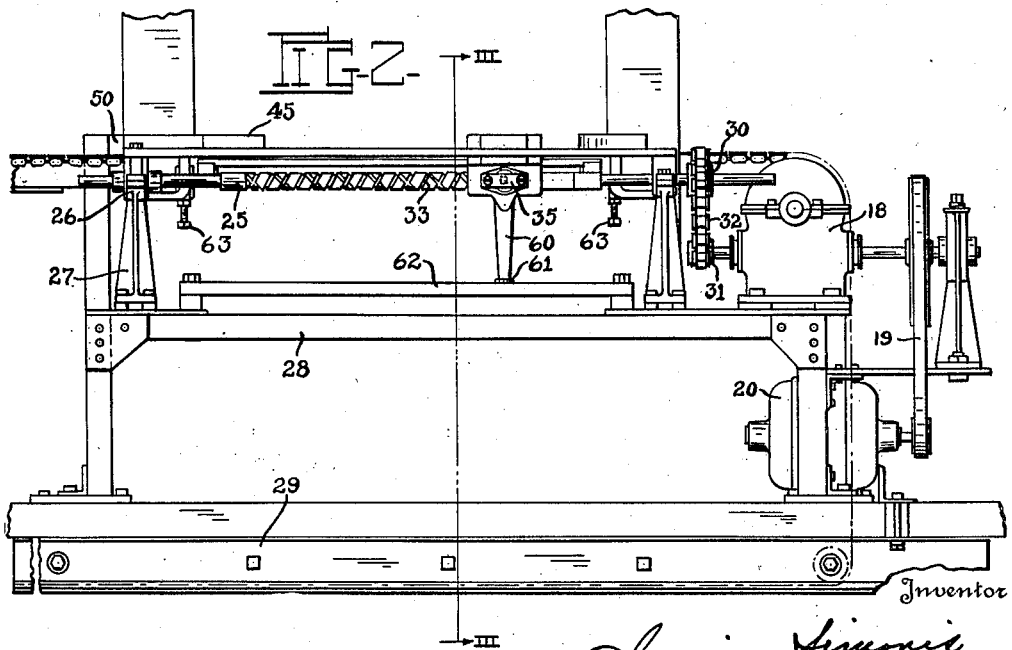

Dec. 16, 1930.  I. SIMONIS  1,785,534
LEER FEEDER
Filed April 12, 1928  2 Sheets-Sheet 2
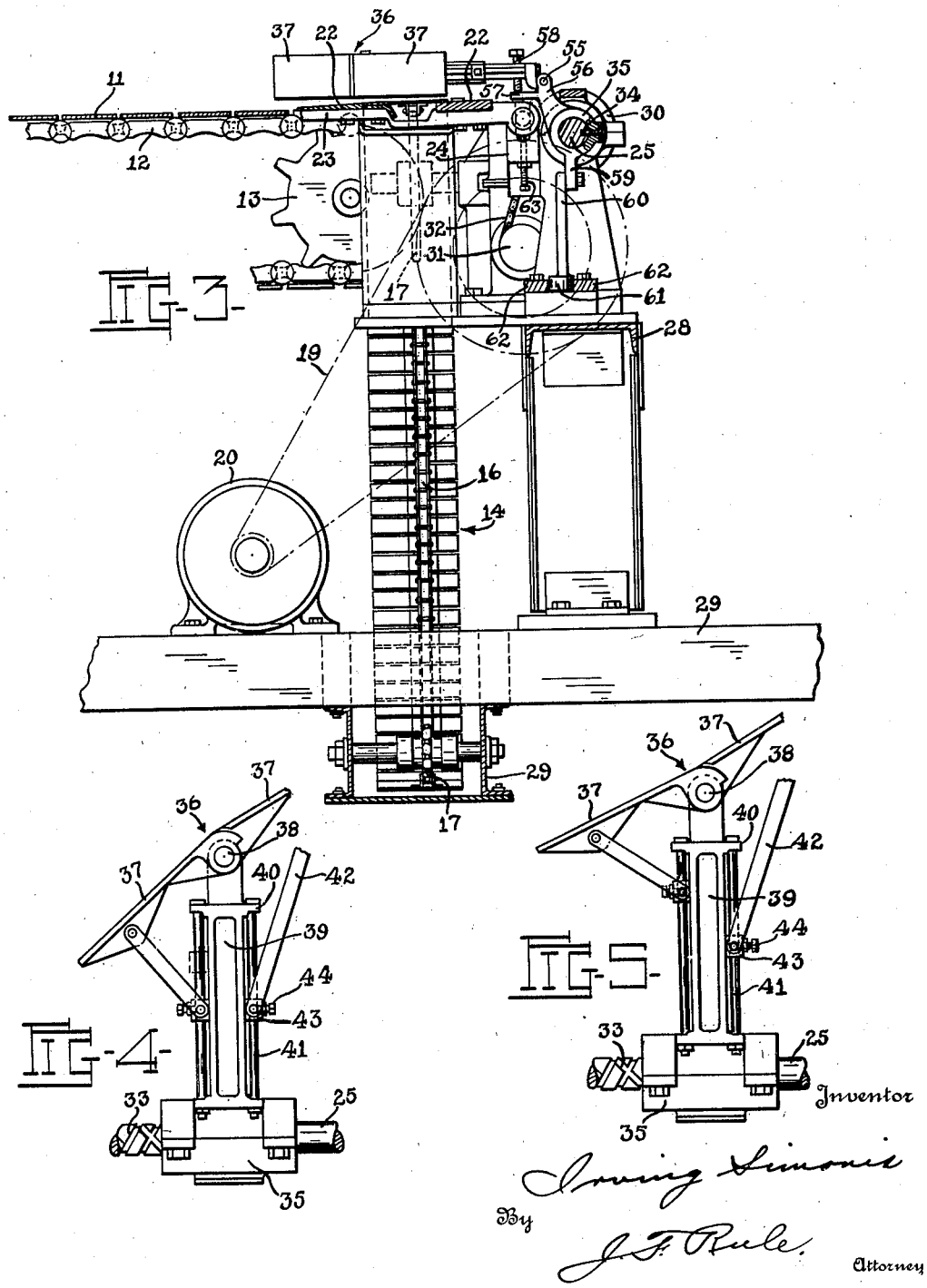

Patented Dec. 16, 1930

1,785,534

UNITED STATES PATENT OFFICE

IRVING SIMONIS, OF TOLEDO, OHIO, ASSIGNOR TO OWENS-ILLINOIS GLASS COMPANY, OF TOLEDO, OHIO, A CORPORATION OF OHIO

LEER FEEDER

Application filed April 12, 1928. Serial No. 269,317.

The present invention relates to improvements in leer feeders associated with glassware annealing leers in which the ware is conveyed through a tunnel in carrying out the annealing process.

An object of the present invention is to provide a leer feeder capable of handling several types and sizes of ware with equal facility and to generally simplify feeder construction and operation.

Another object is to provide a leer feeder including a cross conveyor and means to remove ware therefrom, said means being readily removable and replaceable when necessary.

A further object is to provide in a leer feeder of the type herein disclosed, means by which the cross conveyor for carrying ware into the leer may be tilted or inclined to facilitate sliding movement of the ware therefrom to a conveyor running through the leer.

Other objects will be apparent hereinafter.

In the accompanying drawings:

Fig. 1 is a fragmentary plan view showing a leer feeder in operative relation to a glassware annealing leer.

Fig. 2 is a front end elevation thereof.

Fig. 3 is a sectional side elevation taken at the plane of the lines III—III on Figs. 1 and 2.

Fig. 4 is a top plan view of the adjustable pusher.

Fig. 5 is a view similar to Fig. 4, showing the manner in which the pusher may be angularly adjusted.

In the drawings, the feeder is illustrated in conjunction with a glassware annealing leer 10, including a leer conveyor 11, by which ware is carried through the leer for heat treatment in the usual or any preferred fashion. This ware conveyor 11 includes a series of pans connected together by sprocket chains 12 running over sprockets 13. Means (not shown) may be provided to impart continuous or intermittent movement to the conveyor 11.

The leer feeder includes an endless belt 14 or cross conveyor (Figs. 1 and 3) extending transversely of the ware receiving end of the leer conveyor 11 and having portions extending beyond the sides of the leer 10. This feeding belt 14, according to the present disclosure, is composed of a series of flat plates 15 extending transversely across and secured to a sprocket chain 16 running over vertically spaced sprockets 17. This feeding belt or cross conveyor 14 is driven through a speed reduction gearing 18 and belt 19 by a motor 20 of any preferred type.

The upper or ware supporting reach 21 has its opposite margins riding upon ledges 22 (Fig. 3) which serve to hold the cross conveyor in a proper plane for supporting ware which is being delivered to the leer. These ledges 22 are secured to the upper sides of vertically adjustable supporting arms 23 mounted on a frame 24. The ledge 22 at the outer end of the arms rides upon the leer conveyor 11, and as shown, tapers toward its free edge to facilitate movement of ware from the transversely inclined cross conveyor to the leer conveyor 11. A longitudinal recess (Fig. 3) in the upper face of said ledge 22 receives the adjacent margin of the upper reach of the cross conveyor. The other margin of the cross conveyor 14 rides at a higher elevation upon the other ledge 22, thereby giving the conveyor 14 a transverse inclination which with the tapered ledge 22 assists the pusher or plow 36 quite materially in the removal of ware from the conveyor. Set screws 63 are provided to raise or lower the arms 23 to vary the transverse inclination of the feeding conveyor 14 and the inner ledge 22.

Arranged behind the cross conveyor 14 is a rotatable screw shaft 25 having its ends journalled in bearings 26 (Figs. 1 and 2) at the upper end of standards 27, the latter being suitably supported on the frame 28 which is built upon a base 29. One end of the screw shaft 25 carries a sprocket 30 to which rotary motion is imparted from the speed reduction gearing 18 by way of a sprocket 31 and a chain 32, the latter being trained over said sprockets. The screw shaft is formed with double spiral threads 33 (Fig. 2) of different pitches, receiving a spring pressed detent 34 removably carried by a bearing block 35 (Figs. 1 and 3), which in part supports a plow or pusher 36 for removing ware from the cross conveyor 14.

This plow or pusher 36 comprises a pair of blades 37 set on edge and fulcrumed at their inner adjacent ends to a common vertical hinge pin 38, the latter being carried by an arm 39 extending forwardly over the cross conveyor 14 from a bearing block 35 to which it is hinged, the latter reciprocating longitudinally of the screw shaft 33 upon rotation of the latter. This arm 39 is formed on each vertical side with a pair of lateral ears 40 (Figs. 4 and 5) in which the opposite ends of a guide rod 41 are fixed. One section or blade 37 of the plow or pusher is connected through a link 42 to a slide block 43 which is slidable upon a rod 41 on the corresponding side of the arm. A set screw 44 carried by each slide block 43 is operable to fix said block at any adjusted position on the corresponding guide rod 41. Thus, provision is made for setting the blades at the proper angles relative to each other and to the cross conveyor as is found most effective in pushing ware from the cross conveyor 14. Preferably the arm 39 is fulcrumed to a horizontal hinge pin 55 at the upper end of an extension 56 on the bearing block 35 (Fig. 3), said extension also formed with a stop 57 upon which rests the lower end of an adjusting screw 58 carried by the arm 39. This construction provides for any necessary tilting or vertical adjustment of the shoe or pusher relative to the cross conveyor. An ear 59 depending from the bearing block 35 removably carries a depending arm 60 on the lower end of which is mounted a roller 61 riding in a trackway formed between horizontally spaced rails 62. This latter construction permits free reciprocation of the slide block and elements carried thereby longitudinally of the cross conveyor and at the same time prevents accidental variation in the angle or plane in which the shoe or pusher travels.

A deflector 45 (Fig. 1) is fulcrumed to a vertical hinge pin 46 carried by a stationary frame 47 adjacent one end of the cross conveyor and at one side of the feeding end of the leer conveyor 11. The deflector comprises in its simplest form, as illustrated, a substantially V-shaped member positioned with one blade at a rather sharp angle to the path of travel of the cross conveyor, while the other blade or guard portion 48 extends longitudinally along and over one margin of said cross conveyor. This deflector is connected by a rod 49 adjustable in length, to an end wall 50 of said stationary frame 47. A coil spring 51 encircles the rod between said end wall 50 and a collar 52 on the rod and operates to yieldingly hold the deflector in substantially the position shown in Fig. 1.

The operation may be stated as follows:

Assuming that ware is being deposited upon the cross conveyor 14 at the left end thereof in Fig. 1 and that this cross conveyor is moving toward the right of said figure, the rotary screw shaft 33 transmits a reciprocating motion to the pusher or plow, causing the latter to first move along a path in a direction opposite to that being traveled by the ware. Due to the inclination or angular position of the plow or pusher 36, movement of the latter, as just stated, moves the ware coming in contact therewith laterally from the transversely inclined cross conveyor 14 over the inner inclined ledge 22 to a position upon the leer conveyor 11. Upon reaching the opposite side of the leer, the direction of movement of the plow is reversed by engagement of the detent 34 with the reversing screw thread which is of greater pitch than that of the other thread. Thus, the return movement of the plow to the opposite side of the leer is more rapid than the movement during removal of ware from the cross conveyor.

In the event an article of ware adjacent one end of the working stroke of the plow becomes positioned substantially as shown in dotted lines at "A" in Fig. 1, said plow exerts pressure through the article upon the deflector 45, causing the latter to swing about its fulcrum and compress the spring 51. This brings the deflector to the dotted line position (Fig. 1) in which it projects some distance over the cross conveyor 14, said article of ware moving a corresponding distance along the edge of the conveyor. Upon reverse movement of the plow, the coil spring 51 returns the deflector to its original position as shown in full lines in Fig. 1, thereby transferring the article from the cross conveyor 14 to the inner ledge 22. Thus, this deflector serves as an auxiliary pusher in removing ware from the cross conveyor beyond the normal operating limits of the plow 26 and insures clearing the conveyor of ware with each working stroke of the plow 36.

Modifications may be resorted to within the spirit and scope of the appended claims.

What I claim is:

1. A leer feeder comprising, in combination, a ware conveyor, a plow arranged over the conveyor, means to reciprocate the plow longitudinally of the conveyor to move ware from the conveyor to one side thereof, and means to transversely incline the ware supporting areas of the conveyor to facilitate removal of ware therefrom.

2. In combination, a leer, means to convey ware therethrough; a leer feeder comprising a cross conveyor extending transversely of one end of the leer, means to transversely incline the cross conveyor to facilitate transverse sliding of ware from the latter to the leer conveyor, and means for effecting transverse sliding movement of ware from the cross conveyor to the leer conveyor, said last named means comprising a plow reciprocable longitudinally of the cross conveyor.

3. In a leer feeder, a ware conveyor adapted to carry ware transversely of a leer into the annealing chamber of the latter, means to transversely incline the ware carrying area of said conveyor to facilitate transverse sliding of ware therefrom, and a plow movable longitudinally of said ware carrying area to remove ware therefrom.

4. In combination, a leer, means to convey ware therethrough, a cross conveyor extending transversely over one end of the ware conveying means, a plow arranged over said cross conveyor, means to reciprocate the plow to move ware transversely from the cross conveyor, and auxiliary means arranged at one side of the leer and adapted at times to cooperate with the plow in removing ware from the cross conveyor, said auxiliary means including a yielding deflector mounted for horizontal swinging movement across a portion of said conveyor.

5. In a leer feeder, the combination of a ware conveyor, a plow arranged over said conveyor, means to reciprocate the plow longitudinally of the conveyor to remove ware from the latter by a transverse sliding movement of the ware on said conveyor, a support for the plow, and a connection between the plow and support whereby the former may be swung about a horizontal axis extending through the support to vary the spaced relation between the plow and conveyor.

6. In a leer feeder, the combination of a ware conveyor, and a plow movable longitudinally over said conveyor to slide ware transversely from the latter, said plow comprising a pair of sections hinged together and adjustable in a horizontal plane relative to each other and to the conveyor.

7. In a leer feeder, the combination of a ware conveyor, a plow movable longitudinally over said conveyor to slide ware transversely from the latter, said plow comprising a pair of sections hinged together and adjustable in a horizontal plane relative to each other and to the conveyor, a plow support secured to the sections, and means in part carried by said support to lock the sections in any adjusted relation to each other.

Signed at Toledo, in the county of Lucas and State of Ohio, this 6th day of April, 1928.

IRVING SIMONIS.